(12) United States Patent
Matsunaga

(10) Patent No.: US 10,796,576 B2
(45) Date of Patent: Oct. 6, 2020

(54) MOVING OBJECT CONTROL APPARATUS AND METHOD OF CONTROLLING MOVING OBJECT

(71) Applicant: DENSO CORPORATION, Kariya, Aichi-pref. (JP)

(72) Inventor: Shogo Matsunaga, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 75 days.

(21) Appl. No.: 16/062,549

(22) PCT Filed: Dec. 7, 2016

(86) PCT No.: PCT/JP2016/086346
§ 371 (c)(1),
(2) Date: Jun. 14, 2018

(87) PCT Pub. No.: WO2017/104503
PCT Pub. Date: Jun. 22, 2017

(65) Prior Publication Data
US 2018/0374352 A1    Dec. 27, 2018

(30) Foreign Application Priority Data
Dec. 17, 2015    (JP) .................................. 2015-246692

(51) Int. Cl.
*G08G 1/16*    (2006.01)
*G01S 7/40*    (2006.01)
(Continued)

(52) U.S. Cl.
CPC .............. *G08G 1/16* (2013.01); *B60R 21/00* (2013.01); *B60T 7/12* (2013.01); *B60T 7/22* (2013.01);
(Continued)

(58) Field of Classification Search
CPC . G08G 1/16; B60W 30/09; G01S 7/40; G01S 7/4972; G01S 3/86; B60T 2201/08; G06K 9/00
See application file for complete search history.

(56) References Cited

U.S. PATENT DOCUMENTS 5,832,407 A * 11/1998 Kai ....................... G01S 7/4972
701/466
2004/0193347 A1    9/2004 Harumoto et al.
(Continued)

FOREIGN PATENT DOCUMENTS

JP    9-281239 A    10/1997
JP    10-132939 A    5/1998
(Continued)

*Primary Examiner* — Yuri Kan
(74) *Attorney, Agent, or Firm* — Maschoff Brennan

(57) ABSTRACT

A moving object control apparatus includes an object detecting device that detects an object present around a moving object. The moving object control apparatus performs predetermined control based on a detection result of the object detecting device while the moving object is moving. In the moving object control apparatus a trajectory of a stationary object relative to the moving object is acquired and a moving direction of the moving object is acquired. An angle of axial displacement of a center axis of the object detecting device is calculated, as axial displacement information, based on the trajectory and the moving direction. The predetermined control is performed based on the axial displacement information. A regulating unit regulates reflecting the axial displacement information in the predetermined control if an absolute value of an angular acceleration around a center of gravity of the moving object is larger than a preset threshold value.

19 Claims, 8 Drawing Sheets

(51) Int. Cl.

| | |
|---|---|
| *B60R 21/00* | (2006.01) |
| *B60T 7/22* | (2006.01) |
| *B60T 8/17* | (2006.01) |
| *B60T 8/1755* | (2006.01) |
| *B60T 7/12* | (2006.01) |
| *B60W 30/09* | (2012.01) |
| *G01S 13/86* | (2006.01) |
| *G01S 13/931* | (2020.01) |
| *G01S 7/41* | (2006.01) |

(52) U.S. Cl.
CPC ............ *B60T 8/17* (2013.01); *B60T 8/17558* (2013.01); *B60W 30/09* (2013.01); *G01S 7/40* (2013.01); *G01S 7/4026* (2013.01); *G01S 13/867* (2013.01); *G01S 13/931* (2013.01); *G08G 1/166* (2013.01); *B60T 2201/024* (2013.01); *B60T 2201/16* (2013.01); *B60W 2554/00* (2020.02); *G01S 7/415* (2013.01); *G01S 2007/4091* (2013.01); *G01S 2013/932* (2020.01); *G01S 2013/93271* (2020.01)

(56) References Cited

U.S. PATENT DOCUMENTS

| | | | |
|---|---|---|---|
| 2008/0012752 A1* | 1/2008 | Okamura | ............. G01S 7/4026 342/165 |
| 2010/0123778 A1 | 5/2010 | Hada | |
| 2012/0072097 A1 | 3/2012 | Ohta et al. | |
| 2012/0314055 A1 | 12/2012 | Kataoka | |
| 2014/0226015 A1 | 8/2014 | Takatsudo et al. | |
| 2015/0103174 A1 | 4/2015 | Emura et al. | |
| 2017/0262716 A1* | 9/2017 | Matsumoto | ........ G06K 9/00798 |
| 2017/0307730 A1* | 10/2017 | Baba | ......................... G01S 7/40 |
| 2017/0315207 A1* | 11/2017 | Baba | ..................... B60R 21/00 |
| 2018/0118201 A1* | 5/2018 | Matsunaga | ............... B60T 7/12 |
| 2018/0170429 A1 | 6/2018 | Shimizu | |

FOREIGN PATENT DOCUMENTS

| | | | | |
|---|---|---|---|---|
| JP | 11-337310 A | | 12/1999 | |
| JP | 11337310 A | * | 12/1999 | .......... B60T 2201/08 |
| JP | 2003-306075 A | | 10/2003 | |
| JP | 2010-173530 | | 8/2010 | |
| JP | 2014-133512 | | 7/2014 | |

* cited by examiner

FIG.1
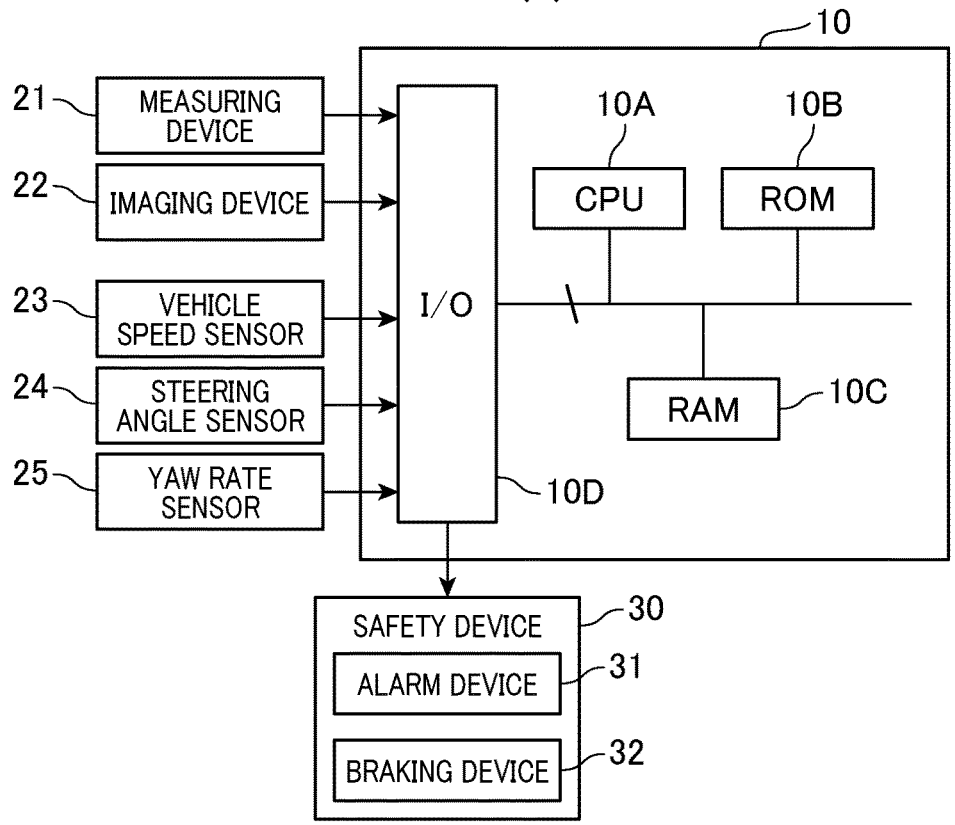
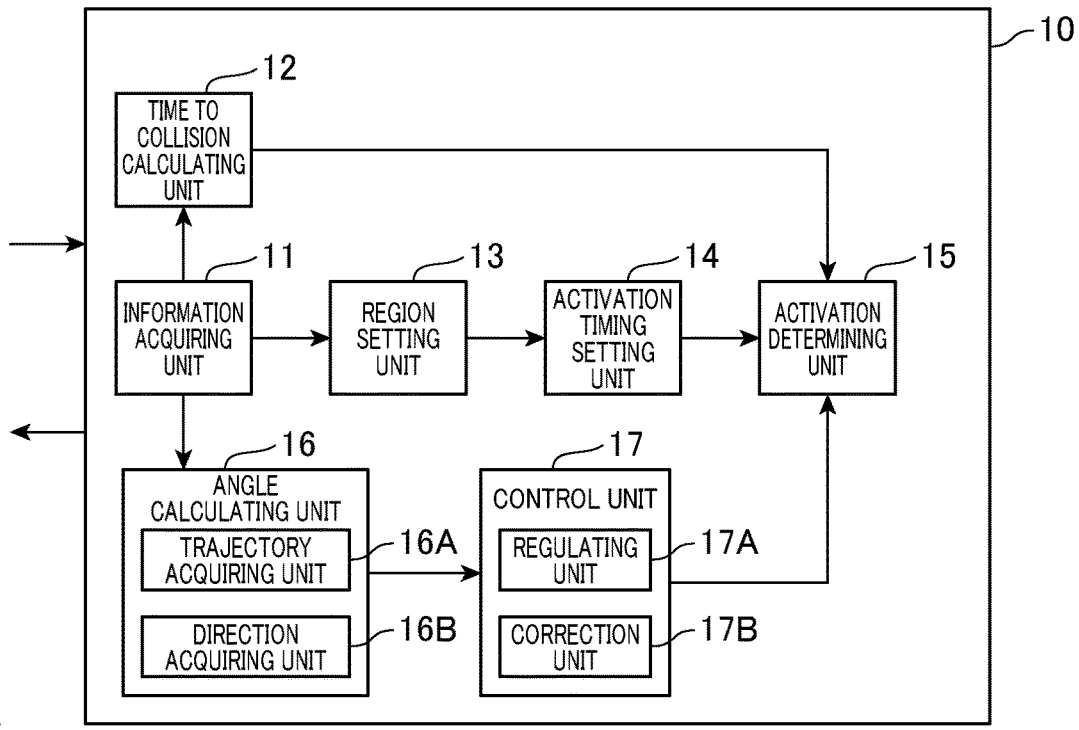

FIG.2
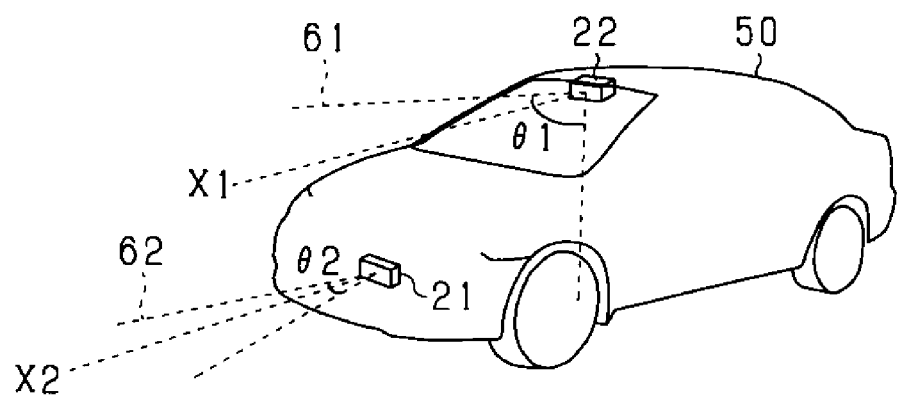
FIG.3
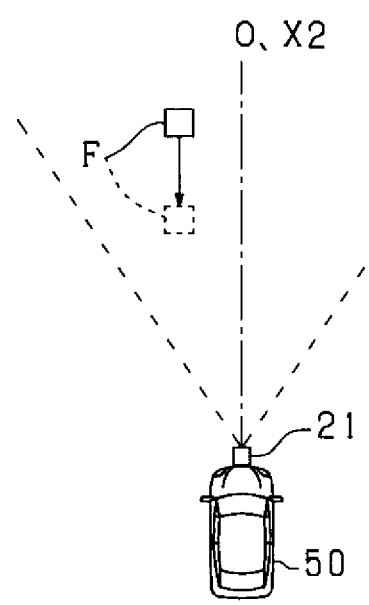
(a)
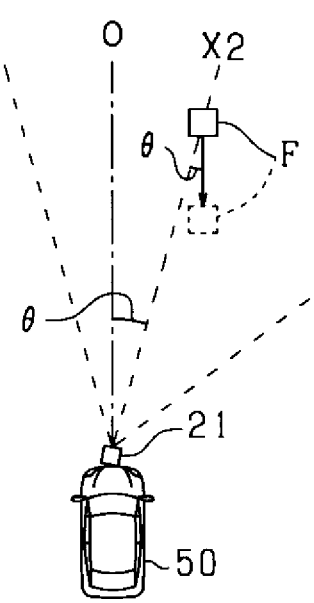
(b)

MOVING OBJECT CONTROL APPARATUS AND METHOD OF CONTROLLING MOVING OBJECT

CROSS-REFERENCE TO RELATED APPLICATION

The present application is based on Japanese Patent Application No. 2015-246692 filed on Dec. 17, 2015, the contents of which are incorporated herein by reference.

BACKGROUND

Technical Field

The present disclosure relates to a moving object control apparatus that performs control using position information of an object detected by an object detecting device, and a method of controlling a moving object that is executed by the moving object control apparatus.

Background Art

A pre-crash safety (PCS) system reduces or prevents damage from a collision between the own vehicle (or simply the vehicle) and an obstacle (object) such as another vehicle, a pedestrian, or a road structure, present ahead of the vehicle and detected by an object detecting device such as an imaging device and a measuring device. The PCS system calculates time to collision (TTC), which is an estimate of the time remaining until the own vehicle collides with an obstacle, based on the relative distance and relative velocity/acceleration between the own vehicle and the obstacle. Based on the calculated TTC, the PCS system uses an alarm device to notify the own vehicle's driver that the own vehicle is approaching the obstacle, or activates a braking device in the own vehicle.

However, upon the occurrence of axial displacement that causes the attachment angle of the object detecting device to be inclined, an obstacle that is not actually located ahead of the own vehicle can be erroneously detected as if it were located ahead of the own vehicle, causing unnecessary activation of a safety device such as the braking device. Note that the object detecting device can be axially displaced, for example, due to vibrations caused while the own vehicle is travelling or the occurrence of a minor collision with the own vehicle.

In this respect, the axial displacement of the object detecting device is detected as described in PTL 1. Specifically, a forward recognition device described in PTL 1 detects a roadside object such as a guardrail using a measuring device, and acquires information on the displacement of the attachment angle of the measuring device based on the trajectory of the position of the roadside object relative to the own vehicle and the traveling direction of the own vehicle. Then, the history of displacement information is statistically processed, whereby the amount of axial displacement that is the angle of displacement of the attachment angle of the measuring device is calculated.

CITATION LIST

Patent Literature

PTL 1: JP H10-132939 A

The forward recognition device described in PTL 1 obtains the amount of displacement of the attachment angle of the measuring device using the direction of travel of the own vehicle and the trajectory of the position of the roadside object relative to the own vehicle. Therefore, when the amount of axial displacement of the measuring device is calculated using erroneous information about the direction of travel of the own vehicle, the calculated value may differ from the actual displacement angle.

SUMMARY

The main object of the present disclosure is to provide a moving object control apparatus and a method of controlling a moving object capable of calculating the amount of axial displacement appropriately.

The present disclosure is a moving object control apparatus including an object detecting device that detects an object present around a moving object. The moving object control apparatus performs predetermined control based on a detection result of the object detecting device while the moving object is moving. The moving object control apparatus includes: a trajectory acquiring unit that acquires a trajectory of a position of a stationary object relative to the moving object; a direction acquiring unit that acquires a moving direction of the moving object; an angle calculating unit that calculates, as axial displacement information, an angle of axial displacement of a center axis of the object detecting device based on the trajectory and the moving direction; a control unit that performs the predetermined control based on the information on axial displacement; and a regulating unit that regulates reflecting the information on axial displacement in the predetermined control when an absolute value of an angular acceleration around a center of gravity of the moving object is larger than a preset threshold value.

The angle of axial displacement of the object detecting device is acquired using the moving direction of the moving object and the trajectory of the stationary object relative to the moving object. In this case, if the acquired moving direction of the moving object differs from the actual moving direction of the moving object, the accuracy of calculating the angle of axial displacement is reduced. The above configuration does not allow the information on axial displacement to be reflected in the predetermined control performed by the control unit if the absolute value of the angular acceleration around the center of gravity of the moving object is larger than the preset threshold value. Therefore, when the acquired moving direction is likely to differ from the actual moving direction, reflecting information on axial displacement in the predetermined control can be prevented.

BRIEF DESCRIPTION OF DRAWINGS

The above and other objects, features, and advantages of the present disclosure will be further clarified by the detailed description below with reference to the accompanying drawings. In the accompanying drawings:

FIG. 1 shows in (a) and (b) diagrams each illustrating a configuration of a vehicle control apparatus according to the present embodiment.

FIG. 2 is a diagram illustrating the positions at which a measuring device and an imaging device are attached.

FIG. 3 shows in (a) and (b) diagrams each illustrating the principle of acquiring information on axial displacement.

DESCRIPTION OF EMBODIMENTS

Figure 4:
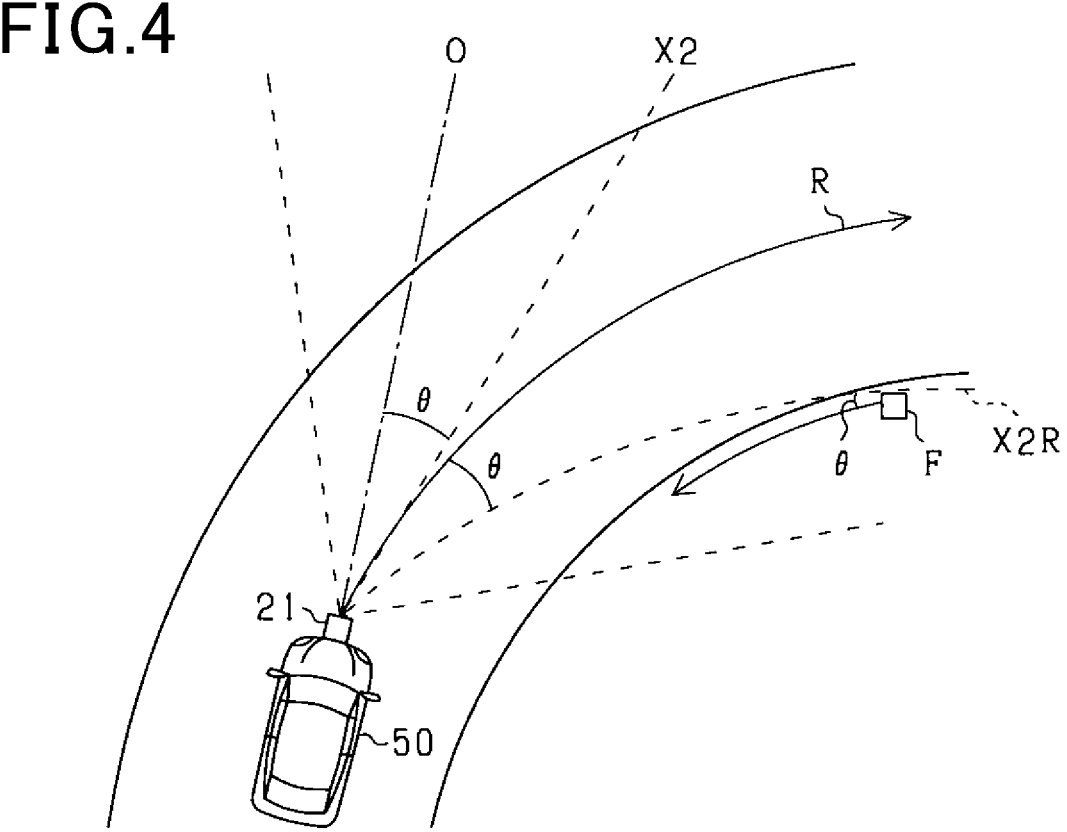
FIG. 4 is a diagram illustrating an example of acquiring information on axial displacement in a curved section of a road.

A moving object control apparatus (hereinafter referred to as a "vehicle control apparatus") 10 according to the present embodiment functions as a PCS system mounted in a vehicle to detect an object present around the vehicle such as ahead of the vehicle in its moving direction and perform control in order to avoid a collision with the object or reduce damage from a collision.

Referring to FIG. 1(*a*), the vehicle control apparatus 10 is a computer including a central processing unit (CPU) 10A, a read only memory (ROM) 10B, a random access memory (RAM) 10C, an input/output (I/O) interface 10D, and the like. The vehicle control apparatus 10 realizes these functions when the CPU 10A executes programs installed on the ROM 10B. The ROM 10B corresponds to a computer-readable recording medium that functions as a non-transitory computer-readable recording medium. In addition to the ROM 10B, examples of recording media include computer-readable electronic media such as a digital versatile disk read only memory (DVD-ROM), a compact disc read only memory (CD-ROM), and a hard disk.

The vehicle control apparatus 10 is connected to a measuring device 21, an imaging device 22, a vehicle speed sensor 23, a steering angle sensor 24, and a yaw rate sensor 25, which are devices that input various types of detection information.

The measuring device 21 is, for example, a well-known millimeter-wave radar that transmits high-frequency signals in a millimeter-waveband, and is attached to the front part of an own vehicle (or simply a vehicle) 50 such that its optical axis X2 is directed ahead of the vehicle. The measuring device 21 scans, with radar signals, a region 62 extending ahead of the vehicle over a predetermined angle θ2 around the optical axis X2. Specifically, the measuring device 21 transmits probing waves at predetermined intervals, and receives reflected waves through a plurality of antennas. The distance to the object is calculated using the time at which a probing wave is transmitted and the time at which a reflected wave is received. The measuring device 21 also calculates relative velocity using the Doppler-shifted frequency of the reflected wave reflected by the object. In addition, the measuring device 21 calculates the azimuth direction of the object using the phase difference between the reflected waves received by the plurality of antennas. If the position and azimuth direction of the object can be calculated, the position of the object relative to the vehicle can be specified. Note that the measuring device 21 transmits probing waves, receives reflected waves, calculates reflection positions and relative velocities, and transmits the calculated reflection positions and relative velocities to the vehicle control apparatus 10 as first detection information at predetermined intervals.

The imaging device 22 is, for example, a monocular imaging device such as a charged-coupled device (CCD) camera, a complementary metal-oxide semiconductor (CMOS) image sensor, and a near-infrared camera. The imaging device 22 is installed, for example, near the upper end of the front windshield of the own vehicle 50 as illustrated in FIG. 2, and captures, from a bird's eye viewpoint, a region 61 extending ahead of the vehicle over a predetermined angle θ1 (θ1>θ2) around an imaging axis X1. The imaging device 22 extracts a feature point indicating the presence of an object in the captured image. Specifically, the imaging device 22 extracts edge points based on information on the luminance of the captured image, and subjects the extracted edge points to the Hough transform. In the Hough transform, for example, a point on a straight line formed by a plurality of aligned edge points or a point at which straight lines cross at right angles is extracted as a feature point. Note that the imaging device 22 captures images, extracts feature points, and transmits the results of extracting feature points to the vehicle control apparatus 10 as second detection information at the same intervals as the measuring device 21 or different intervals.

Since the measuring device 21 and the imaging device 22 detect the position of an object, they can be collectively referred to as an object detecting device.

The vehicle speed sensor 23 is provided on a rotary shaft that transmits power to the wheels of the own vehicle 50, and obtains the speed (moving speed) of the own vehicle 50 based on the rotational speed of the rotary shaft. The steering angle sensor 24 detects the angle of rotation of the steering wheel of the own vehicle 50 as a steering angle. The yaw rate sensor 25 detects the yaw rate actually generated in the own vehicle 50, i.e., the angular velocity around the center of gravity point of the vehicle. The yaw rate sensor 25 has an oscillator, and detects the yaw rate of the own vehicle 50 by detecting the strain generated at the oscillator based on the yaw moment of the own vehicle 50. The vehicle speed sensor 23, steering angle sensor 24, and yaw rate sensor 25 detect the traveling state of the own vehicle 50.

The own vehicle 50 includes an alarm device 31 and a braking device 32 as a safety device 30 that is driven by a control command from the vehicle control apparatus 10.

The alarm device 31 is a speaker and a display installed in the interior of the own vehicle 50. If the vehicle control apparatus 10 determines that the probability of a collision with an obstacle has increased, the alarm device 31 outputs a warning sound, a warning message, or the like to notify the driver of a collision hazard in response to a control command from the vehicle control apparatus 10.

The braking device 32 applies brakes on the own vehicle 50. If the vehicle control apparatus 10 determines that the probability of a collision with an obstacle has increased, the braking device 32 is activated in response to a control command from the vehicle control apparatus 10. Specifically, the braking device 32 increases the braking force relative to a brake operation by the driver (brake assist function) or automatically applies brakes if no brake operation is performed by the driver (automatic brake function).

An information acquiring unit 11 illustrated in FIG. 1(*b*) acquires first detection information from the measuring device 21, and acquires second detection information from the imaging device 22. Then, if a first position that is a position obtained from the first detection information and a second position that is a feature point obtained from the second detection information are close to each other, the information acquiring unit 11 regards the first position and the second position as being based on the same object, and correlates these positions with each other. If the second position is located near the first position, there is a strong probability that the object is actually present at the first position. The state in which the position of an object is accurately obtained by the measuring device 21 and the imaging device 22 is referred to as a fusion state. The object determined to be in the fusion state is subjected to a determination as to whether the object has been continuously in the fusion state with reference to the history of detection. Then, if the object is determined to have been continuously in the fusion state, the presence of the object at that position is finally determined. If the object in the fusion state is put into a non-detection state, the object is treated as being present at the past position for a predetermined period of time with reference to the history of detection.

The second detection information of the object determined to be in the fusion state is subjected to pattern matching using patterns prepared in advance. Then, the object is correlated with a type. Examples of types of objects include automobiles, motorcycles, bicycles, pedestrians, and various road structures. Note that motorcycles and bicycles may be grouped as two-wheeled vehicles.

Next, the information acquiring unit 11 correlates each object with the position and velocity relative to the vehicle. As the relative position, a lateral position indicating the relative distance in the direction orthogonal to the moving direction of the vehicle and a longitudinal position that is the relative position with respect to the moving direction of the vehicle are obtained. Then, based on the relative position and relative velocity, a lateral velocity that is the relative velocity with respect to the direction orthogonal to the moving direction of the vehicle and a longitudinal velocity that is the relative velocity with respect to the moving direction of the vehicle are calculated. The lateral velocity as used herein is considered a value indicating information about the object, and thus can be referred to as an object information value.

A time to collision calculating unit 12 calculates the time to collision, which is the time remaining until the longitudinal position of an object indicating the relative distance between the vehicle and the object reaches zero. Specifically, the longitudinal position of the object is divided by the longitudinal velocity that is the relative velocity between the vehicle and the object, and the obtained time is set as the time to collision. In this case, if the longitudinal velocity is zero or if the longitudinal velocity has a negative value (if the vehicle and the object move away from each other), the longitudinal position is not reduced, and thus the time to collision is not calculated. In addition to the relative distance and relative velocity, relative acceleration may be used for calculating the collision prediction time on the assumption that the object moves with a constant acceleration relative to the vehicle. In this case, even when the relative velocity between the vehicle and the object has a negative value (even when the vehicle and the object move away from each other at the time of calculation), the collision prediction time is calculated as long as the relative acceleration has a positive value (as long as the relative velocity changes to the positive side).

A region setting unit 13 sets an activation region having a predetermined width in the lateral direction orthogonal to the moving direction of the vehicle. The activation region as used herein is a region for determining whether the lateral position of the object is where the safety device 30 should be activated. Specifically, if the lateral position of the object is within the activation region, it is determined that one condition for activating the safety device 30 is satisfied. The activation region is set such that the width of the activation region increases as the lateral velocity of the object increases. This is because even when the object is not located on the course of the vehicle, the safety device 30 needs to be activated more readily since the object having a large lateral velocity is likely to enter the course of the vehicle while the driver is unlikely to recognize the object.

Note that activation regions having different widths or the same width may be applied to the respective functions of the safety device 30. For example, the activation region set for the alarm device 31 has the largest width. This is because if the driver becomes aware of the danger of a collision by the alarm device 31 and performs an operation to avoid a collision, the vehicle control apparatus 10 does not have to give a control command to the braking device 32 in order to avoid a collision.

An activation timing setting unit 14 sets the activation timing for the safety device 30. The activation timing is compared with the above-mentioned collision prediction time. If the position of the object is within the activation region, and if the collision prediction time is equal to or less than the activation timing, the safety device 30 is activated. In other words, the larger the set activation timing is, the earlier the safety device 30 is activated even when the collision prediction time is large.

Different activation timings are set for the respective functions of the safety device 30. Specifically, the largest activation timing is set for the alarm device 31. This is because if the driver becomes aware of the danger of a collision by the alarm device 31 and presses down the brake pedal, the vehicle control apparatus 10 does not have to give a control command to the braking device 32 in order to avoid a collision. Note that separate activation timings are set for the brake assist and automatic brake functions of the braking device 32. These activation timings may be the same or different.

The activation region set by the region setting unit 13 and the activation timing set by the activation timing setting unit 14 are input to an activation determining unit 15. The activation determining unit 15 determines whether the lateral position of the object is within the activation region. If the lateral position of the object is within the activation region, the activation determining unit 15 determines that one condition for activating the safety device 30 is satisfied. Similarly, the activation determining unit 15 determines whether the collision prediction time is equal to or less than the activation timing. If the collision prediction time is equal to or less than the activation timing, the activation determining unit 15 determines that one condition for activating the safety device 30 is satisfied. Then, if the activation determining unit 15 determines that both conditions for activating the safety device 30 are satisfied, the activation determining unit 15 transmits an activation command to the safety device 30 to cause the safety device 30 to execute the corresponding function.

Before whether to activate the safety device 30 is determined as described above, if at least one of the optical axis X2 of the measuring device 21 and the imaging axis X1 of the imaging device 22 is axially displaced, a position different from the actual position of the object is detected. As a result, inactivation and unnecessary activation may occur. As used herein, inactivation means that the safety device 30 is not activated even though the safety device 30 needs to be activated, and unnecessary activation means that the safety device 30 is activated even though the safety device 30 does not need to be activated. Therefore, the vehicle control apparatus 10 according to the present embodiment calculates the amount of axial displacement, i.e., the amount of displacement of the attachment angle of the measuring device 21, using an angle calculating unit 16.

The following paragraphs describe the principle of calculating the amount of axial displacement. FIG. 3 is a diagram illustrating how a stationary object such as a roadside object moves relative to the own vehicle 50 while the own vehicle 50 is traveling straight. Since the own vehicle 50 moves along a center axis O, a predicted course indicating the moving direction of the own vehicle agrees with the center axis O. FIG. 3(a) indicates that the measuring device 21 is attached correctly, and the center axis O (front-back axis) of the own vehicle 50 agrees with the optical axis X2 of the measuring device 21. FIG. 3(b) indicates that the measuring device 21 is axially displaced, and the optical axis X2 is displaced from the center axis O of the own vehicle 50 by an angle θ.

In the case of FIG. 3(a), while the own vehicle 50 is traveling straight, the stationary object such as a road structure (stationary object F) is detected as if it were approaching straight toward the own vehicle 50. In contrast, in the case of FIG. 3(b), the stationary object F is erroneously detected as if it were approaching the own vehicle 50 while laterally (diagonally) moving at the angle θ to the own vehicle 50.

The angle calculating unit 16 acquires, as information on axial displacement of the measuring device 21, angles formed by the trajectory of the stationary object F and the predicted course of the own vehicle 50 at predetermined control intervals. Then, the angle calculating unit 16 accumulates the acquired information on axial displacement in a storage unit of a control unit 17 such as the RAM 10C. Note that the information on axial displacement is not necessarily constant due to the influence of external noise or the like but can vary. Therefore, the angle calculating unit 16 calculates the angle of axial displacement by statistically processing the history of information on axial displacement. For example, the angle corresponding to the center of gravity of the distribution of pieces of information on axial displacement (center of gravity value) is calculated as the angle of axial displacement. Consequently, the accuracy of calculating the angle of axial displacement of the measuring device 21 can be improved, with the influence of variations in information on axial displacement suppressed.

The angle calculating unit 16 also acquires information on axial displacement when the own vehicle 50 is traveling in a curved section of a road. In this case, the angle calculating unit 16 calculates the curvature R of the road by dividing the vehicle speed acquired from the vehicle speed sensor 23 by the yaw rate acquired from the yaw rate sensor 25. Once the curvature R of the road is obtained, the predicted course of the own vehicle 50 follows the curvature R. Since the optical axis X2 of the measuring device 21 turns to an optical axis X2R that follows the curvature R as the own vehicle 50 moves, the position of the stationary object F relative to the own vehicle 50 also follows the curvature R. In contrast, as illustrated in FIG. 4, if the optical axis X2 is displaced, the moving direction of the own vehicle 50 is not parallel to the trajectory of the stationary object F, and the angle θ is calculated. Therefore, the angle θ can be acquired as the information on axial displacement of the optical axis X2 as in the case where the own vehicle 50 moves straight.

Note that the angle calculating unit 16 functionally has a trajectory acquiring unit 16A in order to acquire the relative trajectory of the stationary object F, and the angle calculating unit 16 functionally has a direction acquiring unit 16B in order to acquire the predicted course of the own vehicle 50. The direction acquiring unit 16B acquires the moving direction based on the angular velocity around the center of gravity of the moving object and the moving speed of the moving object.

In a curved section of a road, the predicted course can be accurately obtained based on the yaw rate and vehicle speed as long as the curvature R is constant. However, a road may include a section whose curvature R is not constant. In a case where the own vehicle 50 travels on such a road, an increase in the curvature R makes the calculated curvature R of the predicted course larger than the actual curvature R, and a decrease in the curvature R makes the calculated curvature R of the predicted course smaller than the actual curvature R. Such a road with a variable curvature R is exemplified by an S-shaped curve whose curvature R changes in one direction to a certain point and changes in the opposite direction from the certain point. The entrance to and exit from a curved section of a road is typically designed based on a clothoid curve whose curvature R gradually increases.

Figure 5:
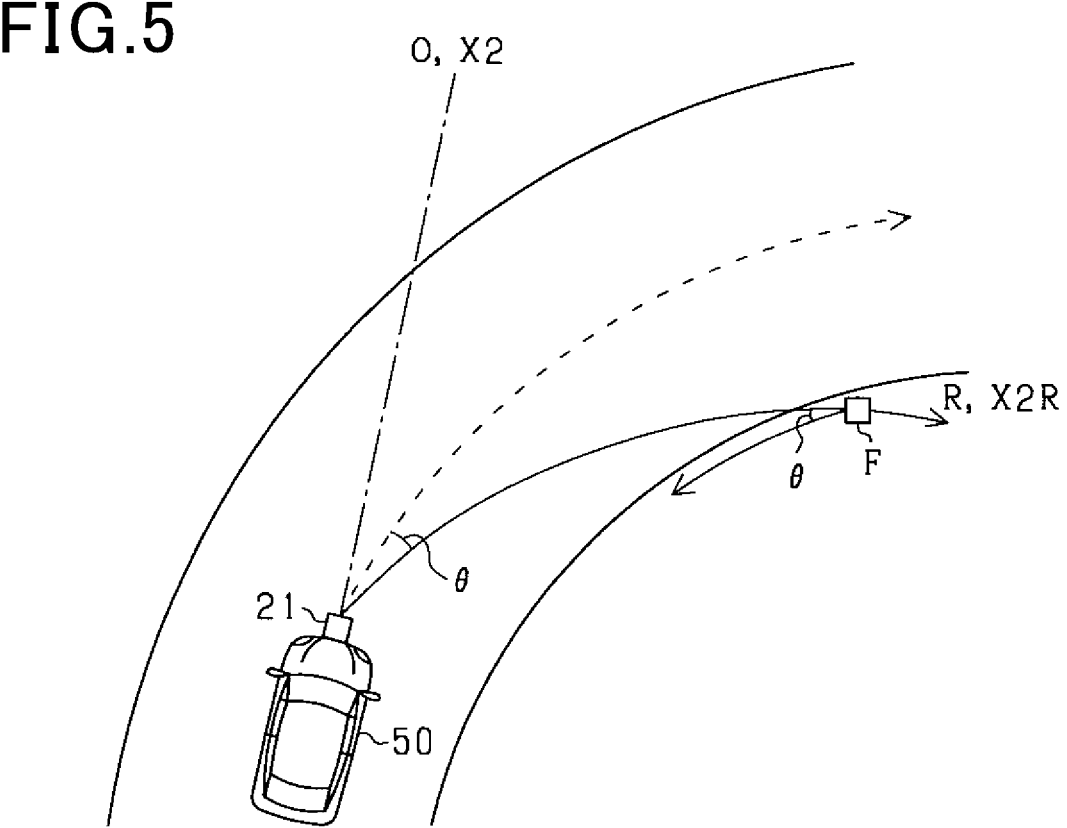
FIG. 5 is a diagram illustrating an example of acquiring information on axial displacement in a section whose curvature is not constant.

FIG. 5 is a diagram illustrating an example of detecting information on axial displacement in a section with a variable curvature R. Although the optical axis X2 is not displaced in the example of FIG. 5, the angle θ is calculated between the predicted course of the own vehicle 50 and the trajectory of the stationary object F that are based on the calculated curvature R. Therefore, even though the optical axis X2 is not displaced, information on axial displacement indicating the occurrence of axial displacement is acquired. Similarly, even when the optical axis X2 is displaced, information on axial displacement indicating that the angle θ is zero may be acquired, or a value larger than the actual amount of axial displacement may be acquired as information on axial displacement. Therefore, if the angle of axial displacement is calculated by statistically processing the information on axial displacement acquired in such a road section, the calculated value differs from the actual angle of axial displacement.

In this regard, a regulating unit 17A of the control unit 17 according to the present embodiment prevents the acquisition of information on axial displacement if the absolute value of the amount of change in yaw rate, i.e., the amount of change in yaw rate per unit time, is equal to or larger than a preset threshold value αth. This makes it possible to prevent information on axial displacement from being acquired in a road section with a variable curvature R such as an S-shaped curve and a clothoid curve, and to improve the accuracy of calculating the angle of axial displacement. Since the yaw rate represents the angular velocity around the center of gravity of the own vehicle 50, the amount of change in yaw rate is the angular acceleration around the center of gravity of the own vehicle 50. Note that the following threshold values are set in advance.

In an S-shaped curve, the yaw rate changes from a certain direction to the opposite direction. In this case, although the absolute value of the amount of change in yaw rate temporarily falls below the threshold value αth, the absolute value of the amount of change in yaw rate exceeds the threshold value αth again after that. Since the curvature R calculated based on the yaw rate in such a section repeatedly changes, information on axial displacement also varies. Therefore, if the acquisition of information on axial displacement is restarted in a section where the amount of change in yaw rate is likely to increase and decrease repeatedly, the accuracy of calculating the amount of axial displacement is reduced.

Thus, the acquisition of information on axial displacement is restarted after a predetermined period of time elapses after the absolute value of the amount of change in yaw rate falls below the threshold value αth.

For the purpose of regulating the acquisition of information on axial displacement, the vehicle control apparatus 10 functionally has the regulating unit 17A.

The amount of axial displacement calculated by the angle calculating unit 16 in this manner is input to a correction unit 17B of the control unit 17. The control unit 17 corrects the position of each object detected by the measuring device 21 and the imaging device 22 based on the amount of axial displacement, and outputs the corrected position to the activation determining unit 15. This enables the activation determining unit 15 to make an accurate determination of activation in spite of the axial displacement of the measuring device 21.

Figure 6:
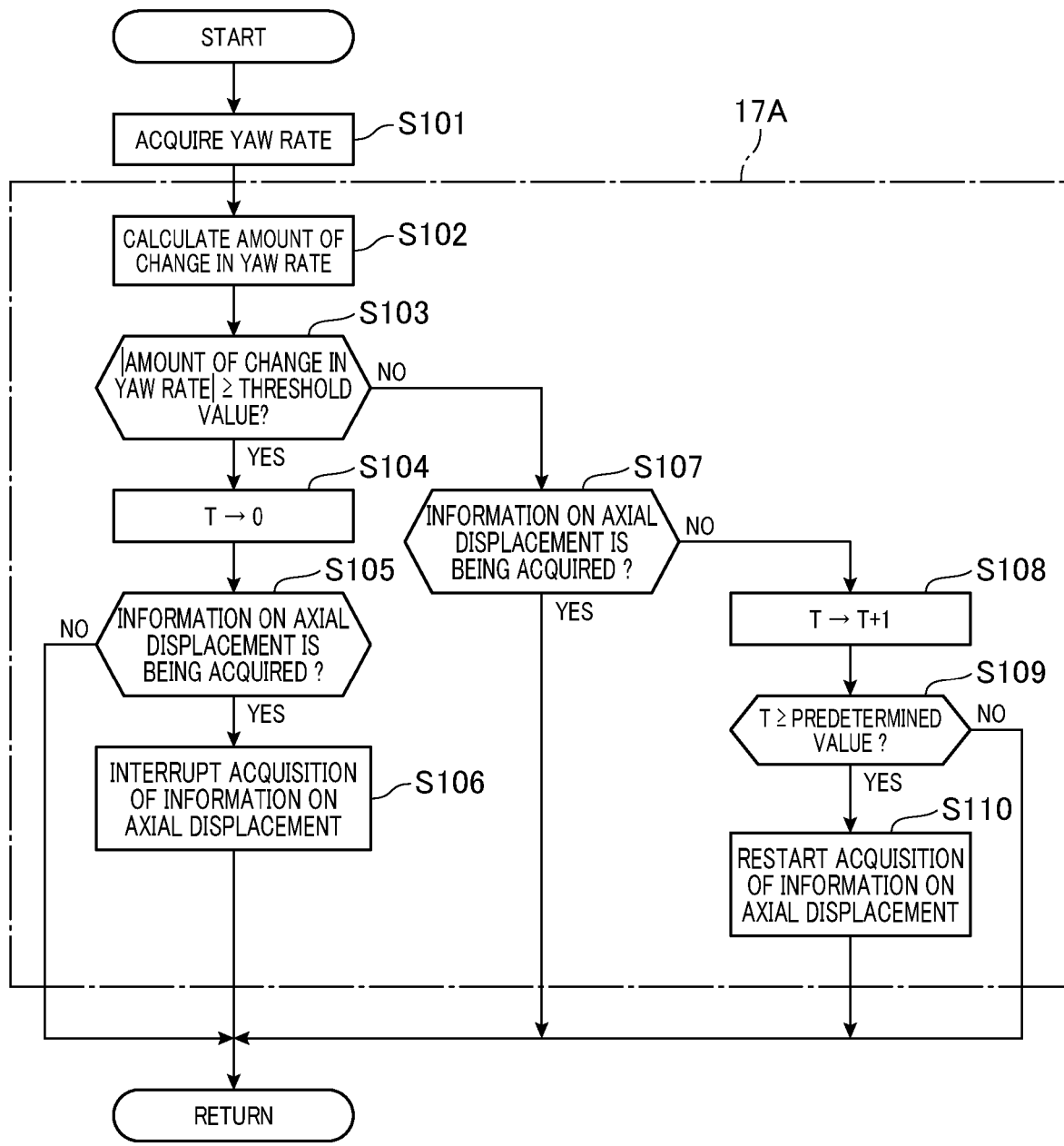
FIG. 6 is a flowchart illustrating a process that is executed by the vehicle control apparatus.

The control for determining whether to acquire the amount of axial displacement that is executed by the vehicle control apparatus 10 configured as mentioned above will be described using the flowchart of FIG. 6. The flowchart illustrated in FIG. 6 is repeatedly executed at predetermined control intervals.

First, the yaw rate detected by the yaw rate sensor 25 is acquired (S101), and the amount of change in yaw rate is calculated (S102). Next, it is determined whether the absolute value of the amount of change in yaw rate is equal to or larger than the preset threshold value αth (S103). If the absolute value of the amount of change in yaw rate is equal to or larger than the threshold value αth (YES in S103), a counter value T for use in determining whether to restart the acquisition of information on axial displacement is reset (S104), and it is determined whether information on axial displacement is being acquired (S105). If information on axial displacement is being acquired (YES in S105), the acquisition of information on axial displacement is interrupted (S106), and the series of processes is terminated. If information on axial displacement is not being acquired (NO in S105), the series of processes is terminated accordingly. In other words, the acquisition of information on axial displacement is kept interrupted.

In contrast, if the amount of change in yaw rate is not equal to or larger than the threshold value (NO in S103), it is determined whether information on axial displacement is being acquired (S107). If information on axial displacement is being acquired (YES in S107), the series of processes is terminated accordingly. In other words, the acquisition of information on axial displacement is continued. If information on axial displacement is not being acquired (NO in S107), the counter value T increments (S108), and it is determined whether the counter value T is equal to or larger than a predetermined value (S109). If the counter value T is equal to or larger than the predetermined value (YES in S109), the acquisition of information on axial displacement is restarted (S110), and the series of processes is terminated. If the counter value T is less than the predetermined value (NO in S109), the series of processes is terminated accordingly. In other words, the acquisition of information on axial displacement is kept interrupted.

Figure 7:
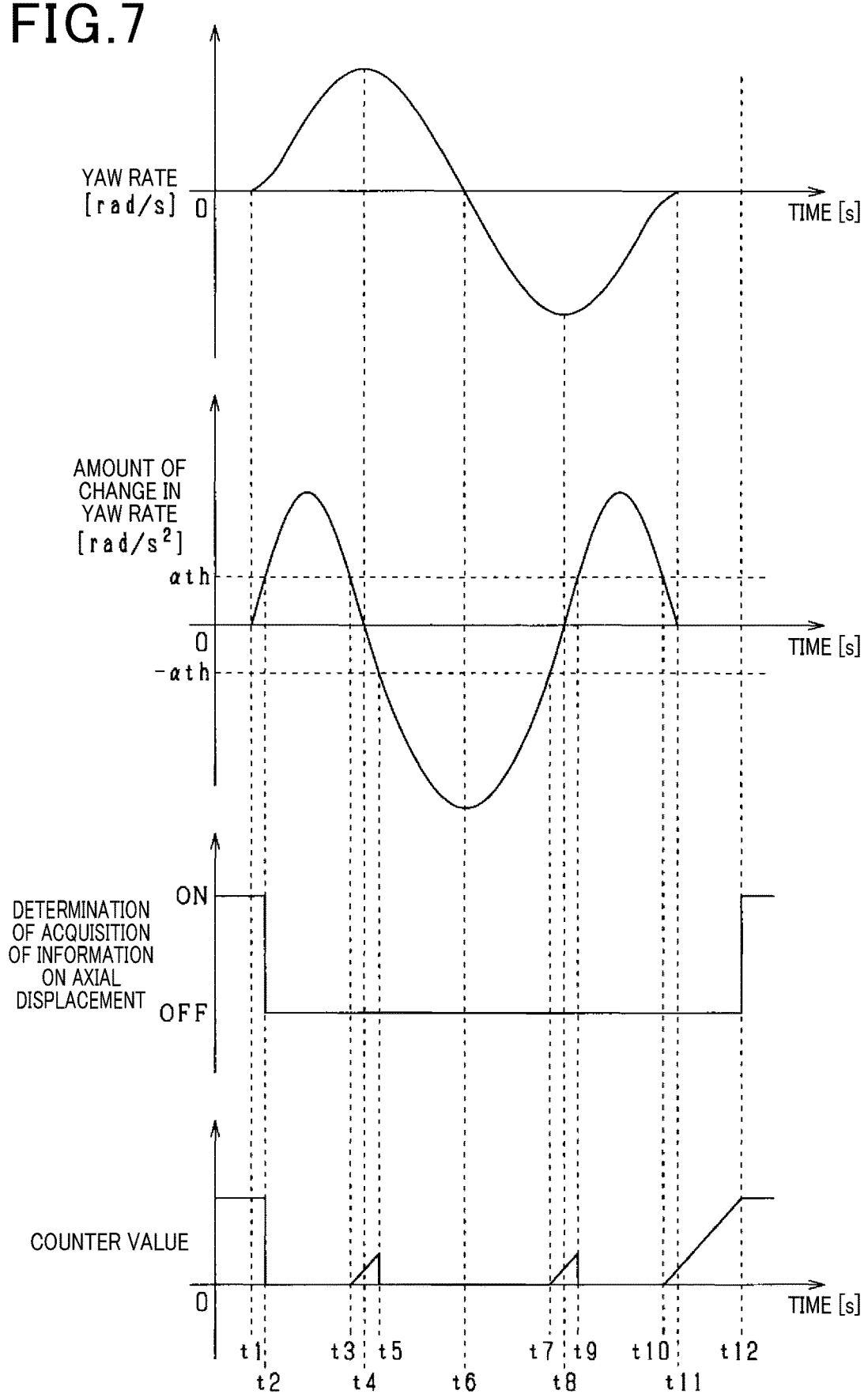
FIG. 7 is a timing diagram for a vehicle traveling on an S-shaped curve.
Figure 8:
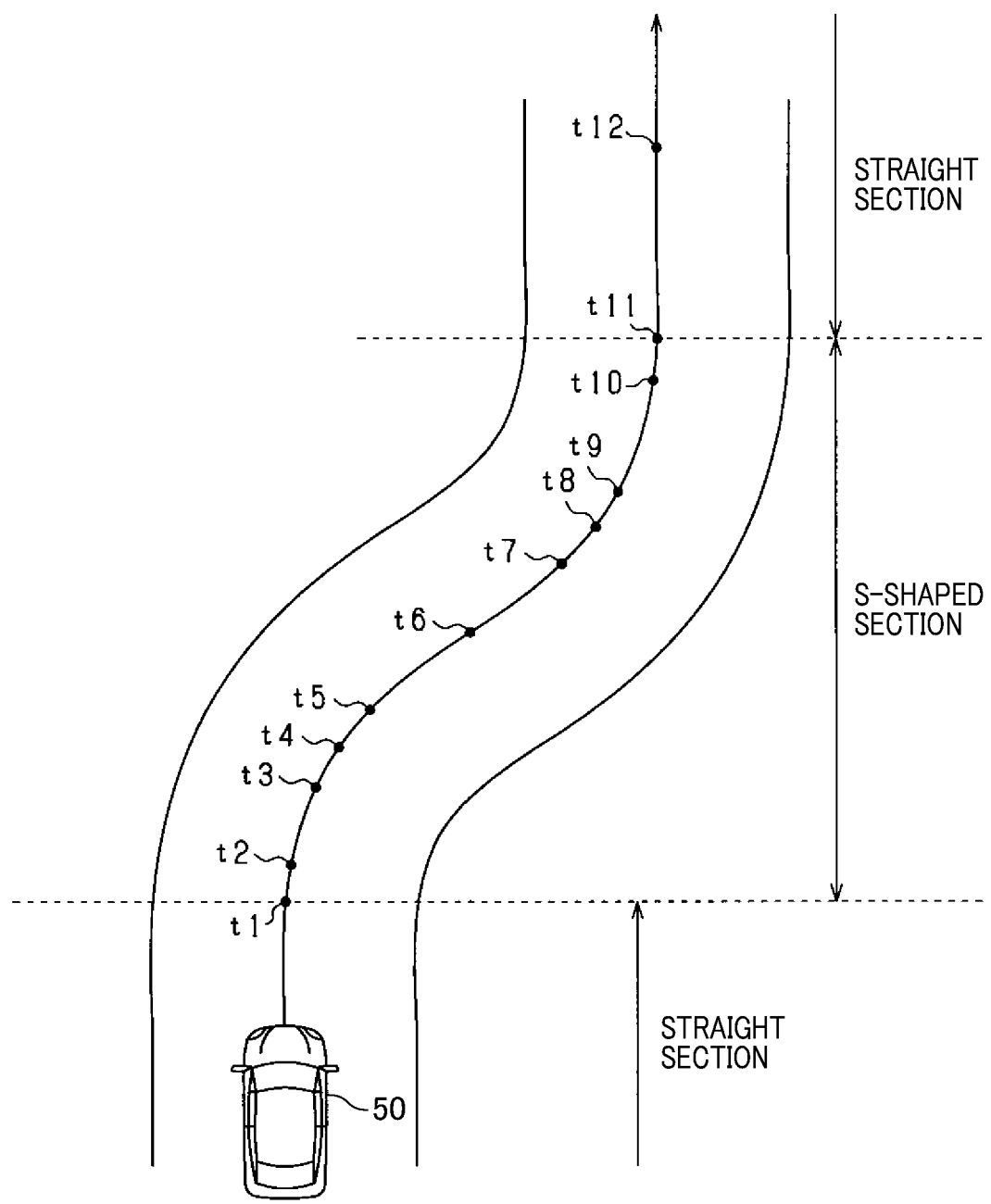
FIG. 8 is a diagram including each time point of the timing diagram plotted on the S-shaped curve.

FIG. 7 is a time chart for the own vehicle 50 traveling on an S-shaped curve, and FIG. 8 is a diagram including each time point of FIG. 7 plotted on the S-shaped curve. In FIG. 7, the yaw rate detected when the own vehicle 50 turns to the right is defined as a positive value, and the yaw rate detected when the own vehicle 50 turns to the left is defined as a negative value. The S-shaped curve in this example is a sequential combination of a first curve to the right and a second curve to the left. The curvature of each of the first and second curves gradually increases to the middle point thereof and gradually decreases from the middle point.

Once the own vehicle 50 enters the first curve of the S-shaped curve from the straight section at time t1, the amount of change in yaw rate increases in the positive direction, and the yaw rate accordingly increases in the positive direction. When the amount of change in yaw rate reaches the positive threshold value αth at time t2, the acquisition of information on axial displacement is interrupted. When the amount of change in yaw rate falls below the positive threshold value αth at time t3, the counter value T starts to increment, but the acquisition of information on axial displacement is not immediately restarted. Since the curvature of the first curve increases to the middle point of the first curve, when the own vehicle 50 passes through the middle point of the first curve at time t4, the yaw rate reaches the local maximum value, and the amount of change in yaw rate turns negative. When the amount of change in yaw rate reaches the negative threshold value αth at time t5, the counter value T is reset.

The own vehicle 50 continues traveling on the S-shaped curve, and when the own vehicle 50 reaches the middle point of the S-shaped curve that is the connection point between the first curve and the second curve at time t6, the yaw rate shifts from positive to negative. At this time, the amount of change in yaw rate reaches the local minimum value, and starts to increase. The amount of change in yaw rate continues increasing, and exceeds the negative threshold value αth at time t7, when the counter value T starts to increment, but the acquisition of information on axial displacement is not immediately restarted. Since the curvature of the second curve increases to the middle point of the second curve, when the own vehicle 50 passes through the middle point of the second curve at time t8, the yaw rate reaches the local minimum value, and the amount of change in yaw rate turns positive. When the amount of change in yaw rate reaches the positive threshold value αth at time t9, the counter value T is reset.

When the own vehicle 50 arrives near the exit from the second curve at time t10, the amount of change in yaw rate falls below the positive threshold value αth, and the counter value T starts to increment. Subsequently, when the own vehicle 50 enters the straight section of the road at time t11, the yaw rate and the amount of change in yaw rate reach zero. At this time, the counter value T continues incrementing, and when the counter value T reaches the predetermined value at time t12, the acquisition of information on axial displacement is restarted.

Figure 9:
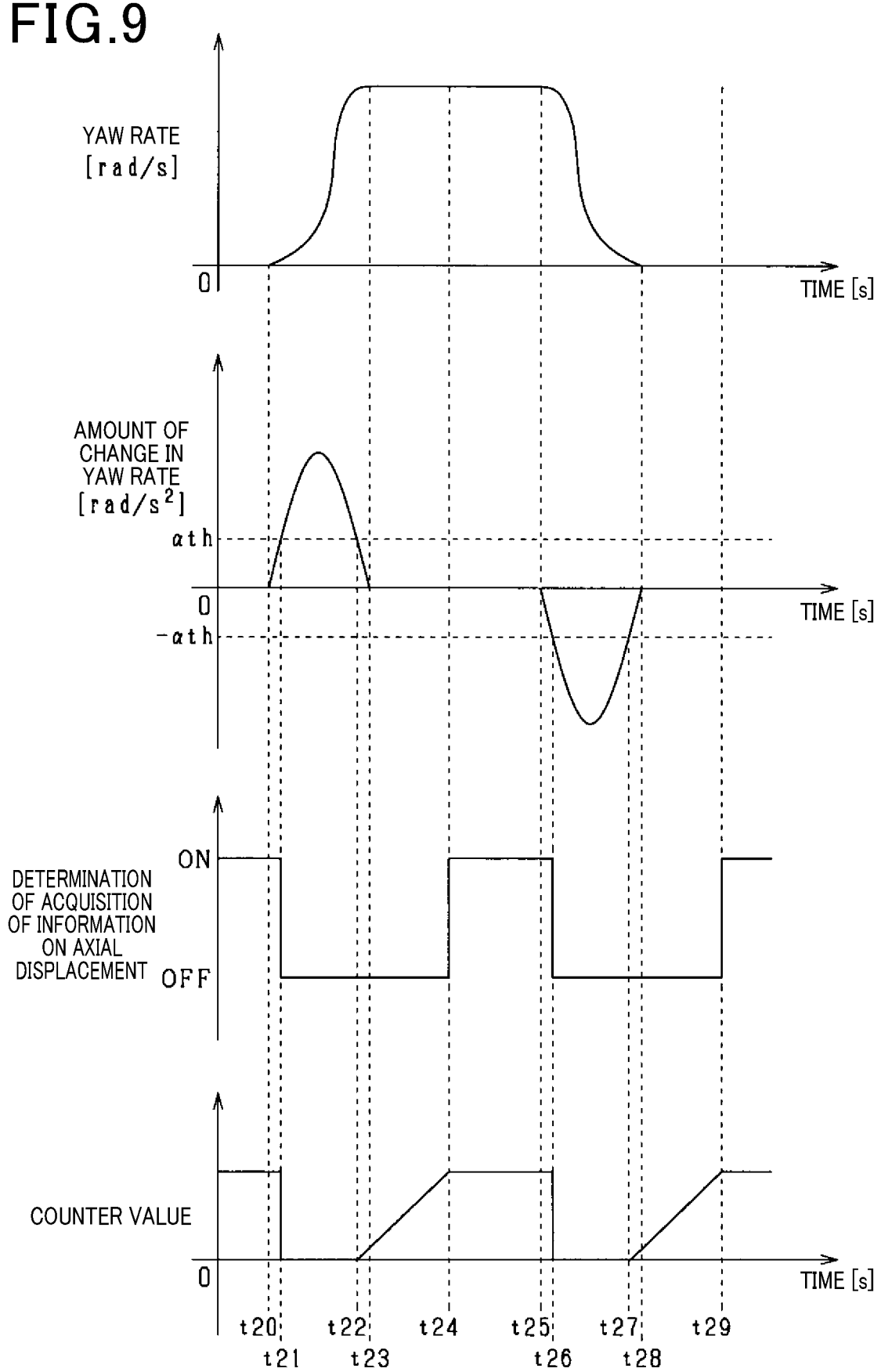
FIG. 9 is a timing diagram for a vehicle traveling on a curve including a section whose curvature is not constant.
Figure 10:
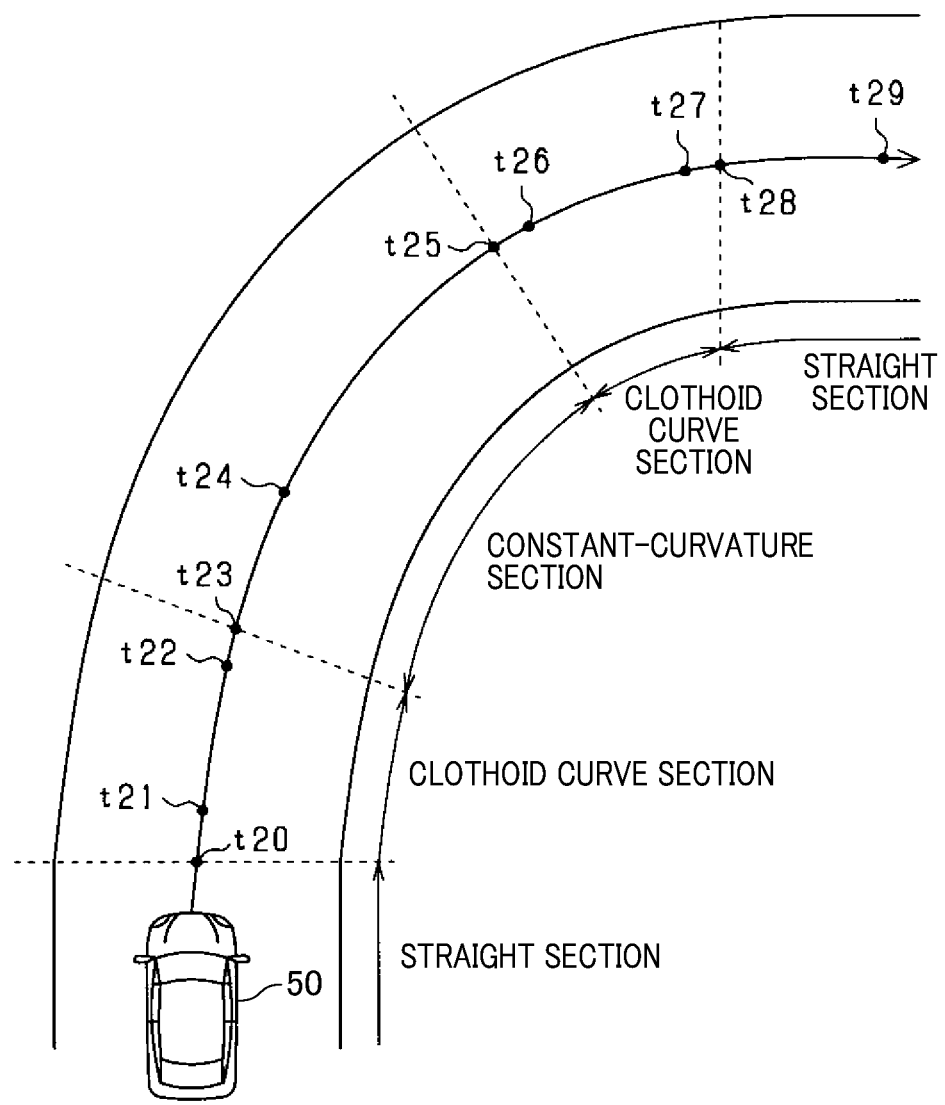
FIG. 10 is a diagram including each time point of the timing diagram plotted on the curve including a section whose curvature is not constant.

FIG. 9 is a timing diagram for the own vehicle 50 traveling on a curve including clothoid curves at both ends thereof and a constant-curvature curve in a predetermined area around the middle point. FIG. 10 is a diagram including each time point of FIG. 9 plotted on the curve.

After the own vehicle 50 enters the clothoid section from the straight section at time t20, the yaw rate increases in the positive direction, and the amount of change in yaw rate accordingly increases in the positive direction. When the amount of change in yaw rate reaches the positive threshold value αth at time t21, the acquisition of information on axial displacement is interrupted. When the amount of change in yaw rate falls below the positive threshold value αth at time t22, the counter value T starts to increment, but the acquisition of information on axial displacement is not immediately restarted.

When the own vehicle 50 enters the constant-curvature section from the clothoid section at time t23, the amount of change in yaw rate reaches zero, and the yaw rate becomes constant. While the own vehicle 50 is traveling in the constant-curvature section, the amount of change in yaw rate does not rise to or above the threshold value, and thus the counter value T continues incrementing. When the counter value T reaches the predetermined value at time t24, the acquisition of information on axial displacement is restarted.

When the own vehicle 50 enters the clothoid section from the constant-curvature section at time t25, the yaw rate starts to decrease, and the amount of change in yaw rate turns negative. When the amount of change in yaw rate reaches the negative threshold value $-\alpha_{th}$ at time t26, the acquisition of information on axial displacement is interrupted. When the own vehicle 50 arrives near the exit from the curve, and the amount of change in yaw rate falls below the positive threshold value $\alpha_{th}$ at time t27, the counter value T starts to increment. When the own vehicle 50 enters the straight section at time t28, the yaw rate and the amount of change in yaw rate reach zero. At this time, the counter value T continues incrementing, and reaches the predetermined value at t29, when the acquisition of information on axial displacement is restarted.

Owing to the above configuration, the vehicle control apparatus 10 according to the present embodiment achieves the following effects.

In a case where the own vehicle 50 travels on a road with a variable curvature R, the predicted course of the own vehicle 50 calculated based on the curvature R differs from the actual road shape. Therefore, if information on axial displacement is acquired based on the relative position of the object acquired on a road with a variable curvature R, the acquired value differs from the actual amount of axial displacement. In the above configuration, information on axial displacement is not acquired if the absolute value of the amount of change in yaw rate exceeds the threshold value $\alpha_{th}$, so that the acquisition of information on axial displacement indicating a value different from the actual amount of axial displacement can be suppressed.

The acquisition of the amount of axial displacement is restarted after a predetermined period of time elapses after the absolute value of the amount of change in yaw rate falls below the threshold value $\alpha_{th}$, so that restarting the acquisition of information on axial displacement in a section where the amount of change in yaw rate is likely to increase and decrease repeatedly can be suppressed.

Whether to acquire information on axial displacement is determined in accordance with the amount of change in yaw rate, so that information on axial displacement can be acquired even in a curve section whose curvature is constant. Therefore, the opportunity to acquire information on axial displacement can be increased.

<Modifications>

In the embodiment, the yaw rate and the amount of change in yaw rate are used for each process. In this regard, the steering angle acquired by the steering angle sensor 24 represents the angular velocity around the center of gravity of the own vehicle 50, and the amount of change in steering angle per unit time represents the angular acceleration around the center of gravity of the own vehicle 50. Therefore, the steering angle may be used for obtaining the predicted course of the own vehicle 50, and whether to acquire information on axial displacement may be determined based on the amount of change in steering angle per unit time.

In the embodiment, the amount of axial displacement of the optical axis X2 of the measuring device 21 is acquired. Alternatively, the amount of axial displacement of the imaging axis X1 of the imaging device 22 can be acquired in a similar manner.

In the embodiment, the measuring device 21 and the imaging device 22 are provided on the center axis O of the own vehicle 50. Alternatively, they may be provided at a predetermined lateral distance from the center axis O of the own vehicle 50. In this case, the amount of axial displacement can be acquired using a process equivalent to the process according to the embodiment as long as the optical axis X2 and the imaging axis X1 are provided in parallel with the center axis O of the own vehicle 50.

In the embodiment, the optical axis X2 of the measuring device 21 and the imaging axis X1 of the imaging device 22 coincide with the center axis O of the own vehicle 50. Alternatively, the measuring device 21 or the imaging device 22 may be provided such that the angle between the optical axis X2 or the imaging axis X1 and the center axis O of the own vehicle 50 is not 0° but has another initial value. In this case, the procedure only needs to include calculating the amount of axial displacement through the process according to the present embodiment, obtaining the difference between the amount of axial displacement and the initial value, and making a correction with the difference.

In the embodiment, information on axial displacement is not acquired if the absolute value of the angular acceleration is larger than the threshold value $\alpha_{th}$. Alternatively, the acquisition of information on axial displacement itself may be continued regardless of the angular acceleration, and the control unit 17 may be configured not to use the information on axial displacement acquired when the absolute value of the angular acceleration is larger than the threshold value $\alpha_{th}$ for calculating the amount of axial displacement. This makes it possible to prevent information on axial displacement from being reflected in control when the absolute value of the angular acceleration is larger than the threshold value $\alpha_{th}$.

In the embodiment, the predicted course of the own vehicle 50 is calculated by dividing the vehicle speed by the yaw rate. Alternatively, the predicted course may be calculated based on the history of movement of the own vehicle 50.

In the embodiment, the vehicle control apparatus 10 is mounted in the vehicle. Alternatively, the vehicle control apparatus 10 may be mounted in a moving object other than the vehicle.

Note that the processes of S103 to S110 in FIG. 6 functionally constitute the regulating unit 17A.

The present disclosure is described with reference to the examples, but it will be understood that the present disclosure is not limited to the examples or configurations. The present disclosure encompasses various modified examples and variations within an equal range. In addition, a category or range of thought of the present disclosure encompasses various combinations or forms and other combinations or forms including only one element, one or more elements, or one or less elements of those.

PARTIAL REFERENCE SIGNS LIST

16 . . . Angle calculating unit
17 . . . Control unit
21 . . . Measuring device
22 . . . Imaging device

The invention claimed is:

1. A moving object control apparatus including an object detecting device that detects an object present around a moving object, the moving object control apparatus being configured to perform predetermined control based on a detection result of the object detecting device while the moving object is moving, the moving object control apparatus comprising:
- a trajectory acquiring unit that acquires a trajectory of a stationary object relative to the moving object;
- a direction acquiring unit that acquires a moving direction of the moving object;
- an angle calculating unit that calculates, as information on axial displacement, an angle of axial displacement of a center axis of the object detecting device based on the trajectory and the moving direction;
- a control unit that performs the predetermined control in response to the information on axial displacement and an angular acceleration around a center of gravity of the moving object; and
- a regulating unit that regulates reflecting the information on axial displacement in the predetermined control if an absolute value of the angular acceleration around a center of gravity of the moving object is larger than a preset threshold value,
- wherein the regulating unit is configured to i) reflect the information on axial displacement after a predetermined period of time elapses after the absolute value of the angular acceleration falls below the threshold value and ii) prevent the axial displacement from being reflected in response to, before the predetermined period of time elapses, the absolute value of the angular acceleration changing from a state where the absolute value of the angular acceleration is below the threshold value to a state where the absolute value of the angular acceleration becomes equal to or over the threshold value, and
- wherein the predetermined period of time is a period that is preset for determining whether the moving object has traveled in a travelling section where the angular acceleration specifically sequentially increases, decreases and increases.

2. The moving object control apparatus according to claim 1, wherein
the angle calculating unit calculates the information on axial displacement at predetermined intervals, and
the regulating unit interrupts reflecting the information on axial displacement if the absolute value of the angular acceleration exceeds the threshold value, and restarts reflecting the information on axial displacement after the predetermined period of time elapses after the absolute value of the angular acceleration falls below the threshold value.

3. The moving object control apparatus according to claim 1, wherein
the control unit performs the predetermined control using a value of a center of gravity of distribution of pieces of the information on axial displacement calculated multiple times, and
the regulating unit regulates reflecting the information on axial displacement in the center of gravity value.

4. The moving object control apparatus according to claim 1, wherein
the direction acquiring unit acquires the moving direction of the moving object based on an angular velocity around a center of gravity of the moving object and a moving speed of the moving object.

5. The moving object control apparatus according to claim 1, wherein
the control unit includes a correction unit that corrects a position of the object detected by the object detecting device based on the information on axial displacement calculated by the angle calculating unit.

6. The moving object control apparatus according to claim 1, wherein
if the absolute value of the angular acceleration around a center of gravity of the moving object is larger than the threshold value, the angle calculation unit omits performing calculation of the information on axial displacement to prevent reflecting of the information on axial displacement in the predetermined control.

7. The moving object control apparatus according to claim 1, wherein
the control unit omits from using the information on axial displacement for the predetermined control that is calculated in response to the absolute value of the angular acceleration around a center of gravity of the moving object being larger than the threshold value to prevent reflecting of the information on axial displacement in the predetermined control.

8. A method of controlling a moving object that is executed by a moving object control apparatus including an object detecting device that detects an object present around a moving object, the moving object control apparatus being configured to perform predetermined control based on a detection result of the object detecting device while the moving object is moving, the method comprising:
- a trajectory acquiring step of acquiring a trajectory of a stationary object relative to the moving object;
- a direction acquiring step of acquiring a moving direction of the moving object;
- an angle calculating step of calculating, as information on axial displacement, an angle of axial displacement of a center axis of the object detecting device based on the trajectory and the moving direction;
- a control step of performing the predetermined control in response to the information on axial displacement and an angular acceleration around a center of gravity of the moving object; and
- a regulating step of regulating reflecting the information on axial displacement in the predetermined control if an absolute value of the angular acceleration around a center of gravity of the moving object is larger than a preset threshold value,
- wherein the regulating step includes i) reflecting the information on axial displacement after a predetermined period of time elapses after the absolute value of the angular acceleration falls below the threshold value and ii) preventing the axial displacement from being reflected in response to, before the predetermined period of time elapses, the absolute value of the angular acceleration changing from a state where the absolute value of the angular acceleration is below the threshold value to a state where the absolute value of the angular acceleration becomes equal to or over the threshold value, and wherein the predetermined period of time is a period that is preset for determining whether the moving object has traveled in a travelling section where the angular acceleration specifically sequentially increases, decreases and increases.

9. The method of controlling a moving object according to claim 8, wherein
the control step includes a correction step of correcting a position of the object detected by the object detecting device based on the information on axial displacement calculated in the angle calculating step.

10. The moving object control apparatus according to claim 2, wherein
the control unit performs the predetermined control using a value of a center of gravity of distribution of pieces of the information on axial displacement calculated multiple times, and the regulating unit regulates reflecting the information on axial displacement in the center of gravity value.

11. The moving object control apparatus according to claim 10, wherein
the direction acquiring unit acquires the moving direction of the moving object based on an angular velocity around a center of gravity of the moving object and a moving speed of the moving object.

12. The moving object control apparatus according to claim 11, wherein
the control unit includes a correction unit that corrects a position of the object detected by the object detecting device based on the information on axial displacement calculated by the angle calculating unit.

13. The moving object control apparatus according to claim 12, wherein
if the absolute value of the angular acceleration around a center of gravity of the moving object is larger than the threshold value, the angle calculation unit omits performing calculation of the information on axial displacement to prevent reflecting of the information on axial displacement in the predetermined control.

14. The moving object control apparatus according to claim 12, wherein
the control unit omits from using the information on axial displacement for the predetermined control that is calculated in response to the absolute value of the angular acceleration around a center of gravity of the moving object being larger than the threshold value to prevent reflecting of the information on axial displacement in the predetermined control.

15. The moving object control apparatus according to claim 3, wherein
the direction acquiring unit acquires the moving direction of the moving object based on an angular velocity around a center of gravity of the moving object and a moving speed of the moving object.

16. The moving object control apparatus according to claim 15, wherein
the control unit includes a correction unit that corrects a position of the object detected by the object detecting device based on the information on axial displacement calculated by the angle calculating unit.

17. The moving object control apparatus according to claim 16, wherein
if the absolute value of the angular acceleration around a center of gravity of the moving object is larger than the threshold value, the angle calculation unit omits performing calculation of the information on axial displacement to prevent reflecting of the information on axial displacement in the predetermined control.

18. The moving object control apparatus according to claim 16, wherein
the control unit omits from using the information on axial displacement for the predetermined control that is calculated in response to the absolute value of the angular acceleration around a center of gravity of the moving object being larger than the threshold value to prevent reflecting of the information on axial displacement in the predetermined control.

19. A moving object control apparatus including:
an object detecting device that detects an object present around a moving object, the moving object control apparatus being configured to perform predetermined control based on a detection result of the object detecting device while the moving object is moving, the moving object control apparatus comprising:
a first acquiring unit acquiring a trajectory of a stationary object relative to the moving object;
a second acquiring unit acquiring a moving direction of the moving object;
a calculating unit calculating, as information on axial displacement, an angle of axial displacement of a center axis of the object detecting device based on the trajectory and the moving direction;
a controlling unit performing the predetermined control based on the information on axial displacement; and
a regulating unit regulating reflecting the information on axial displacement in the predetermined control if an absolute value of an angular acceleration around a center of gravity of the moving object is larger than a preset threshold value,
wherein the regulating unit is configured to i) reflect the information on axial displacement after a predetermined period of time elapses after the absolute value of the angular acceleration falls below the threshold value and ii) prevent the axial displacement from being reflected in response to, before the predetermined period of time elapses, the absolute value of the angular acceleration changing from a state where the absolute value of the angular acceleration is below the threshold value to a state where the absolute value of the angular acceleration becomes equal to or over the threshold value, and
wherein the predetermined period of time is a period that is preset for determining whether the moving object has traveled in a travelling section where the angular acceleration specifically sequentially increases, decreases and increases.

* * * * *